(12) United States Patent
Yamashita et al.

(10) Patent No.: US 12,299,305 B2
(45) Date of Patent: May 13, 2025

(54) INFORMATION PROCESSING DEVICE AND NON-TRANSITORY COMPUTER-READABLE STORAGE MEDIUM

(71) Applicant: Fsas Technologies Inc., Kawasaki (JP)

(72) Inventors: Shota Yamashita, Nagoya (JP); Tomonori Furuta, Nagoya (JP); Tomohiro Uno, Nagoya (JP)

(73) Assignee: FSAS TECHNOLOGIES INC., Kawasaki (JP)

( * ) Notice: Subject to any disclaimer, the term of this patent is extended or adjusted under 35 U.S.C. 154(b) by 310 days.

(21) Appl. No.: 17/370,003

(22) Filed: Jul. 8, 2021

(65) Prior Publication Data

US 2022/0043592 A1 Feb. 10, 2022

(30) Foreign Application Priority Data

Aug. 7, 2020 (JP) .................................. 2020-134377

(51) Int. Cl.
  *G06F 3/06* (2006.01)

(52) U.S. Cl.
  CPC .......... *G06F 3/0641* (2013.01); *G06F 3/0604* (2013.01); *G06F 3/0608* (2013.01); *G06F 3/0644* (2013.01); *G06F 3/067* (2013.01)

(58) Field of Classification Search
  CPC .... G06F 3/0608; G06F 3/0641; G06F 3/0604; G06F 3/067; G06F 3/0644; G06F 3/0605
  USPC ......................................................... 707/692
  See application file for complete search history.

(56) References Cited

U.S. PATENT DOCUMENTS 9,424,285 B1 * 8/2016 Condict .................. G06F 3/067
10,108,544 B1 * 10/2018 Duggal .................. G06F 11/14
10,162,867 B2 12/2018 Harnik et al.
(Continued)

FOREIGN PATENT DOCUMENTS

JP   2016515250 A   *  5/2016
JP   2019-016293 A     1/2019
WO  2016/181479 A1   11/2016

OTHER PUBLICATIONS

Extended European Search Report dated Dec. 8, 2021 for corresponding European Patent Application No. 21182374.5, 10 pages.
(Continued)

*Primary Examiner* — Tony Mahmoudi
*Assistant Examiner* — Kamal K Dewan
(74) *Attorney, Agent, or Firm* — STAAS & HALSEY LLP (57) ABSTRACT

An information processing device includes a processor. The processor configured to extract part of data from estimation target data as a plurality of pieces of sample data and manage a number of duplications of the extracted plurality of pieces of sample data, classify the plurality of pieces of sample data into a first group and a second group based on the number of duplications, the first group having a number of duplications equal to or less that a predetermined number, the second group having a number of duplications more than a predetermined number, specify a first deduplication rate for sample data classified into the first group, specify a second deduplication rate for sample data classified into the second group, and specify a deduplication rate of the estimation target data based on the first deduplication rate and the second deduplication rate.

9 Claims, 12 Drawing Sheets

(56) References Cited

U.S. PATENT DOCUMENTS

| | | | | |
|---|---|---|---|---|
| 2010/0250501 | A1* | 9/2010 | Mandagere | G06F 16/285 |
| | | | | 711/216 |
| 2013/0227237 | A1* | 8/2013 | Tashiro | G06F 3/067 |
| | | | | 711/170 |
| 2014/0229452 | A1* | 8/2014 | Serita | G06F 16/1748 |
| | | | | 707/692 |
| 2014/0304242 | A1* | 10/2014 | Nakamura | G06F 3/067 |
| | | | | 707/692 |
| 2016/0034201 | A1* | 2/2016 | Chambliss | G06F 3/0671 |
| | | | | 711/159 |
| 2017/0017407 | A1* | 1/2017 | Wei | G06F 16/00 |
| 2017/0199895 | A1 | 7/2017 | Harnik et al. | |
| 2017/0262468 | A1* | 9/2017 | Harnik | G06F 16/2365 |
| 2018/0039423 | A1* | 2/2018 | Yoshii | G06F 12/00 |

OTHER PUBLICATIONS

Anonymous: "Frequency Distributions and Histograms", XP055867534, Retrieved from the Internet: URL:https://web.archive.org/web/20190117131819/http://mathcenter.oxford.emory.edu/site/math117/frequencyDistributionsAndHistograms/ [retrieved on Nov. 30, 2021], pp. 1-2, Jan. 17, 2019.

* cited by examiner

$E(n,x) = \Sigma_{\{m=n..M\}} D(m) C(m,n) \cdot x^n \cdot (1-x)^{(m-n)}$ n=1
$E(1,x) = D(1)C(1,1) \cdot x^1 \cdot (1-x)^0 + D(2)C(2,1) \cdot x^1 \cdot (1-x)^1 + D(3)C(3,1) \cdot x^1 \cdot (1-x)^2 + \cdots + D(M)C(M,1) \cdot x^1 \cdot (1-x)^{(M-1)}$ ...(2-1)

n=2
$E(2,x) = D(2)C(2,2) \cdot x^2 \cdot (1-x)^0 + D(3)C(3,2) \cdot x^2 \cdot (1-x)^1 + \cdots + D(M)C(M,2) \cdot x^2 \cdot (1-x)^{(M-2)}$ ...(2-2)

. . .

n=M
$E(M,x) = D(M)C(M,M) \cdot x^M \cdot (1-x)^0$ ...(2-M)

- HASH VALUE
- NUMBER OF DUPLICATIONS

FIG. 8B

- NUMBER OF DUPLICATIONS
- NUMBER OF TYPES OF HUSH VALUES

INFORMATION PROCESSING DEVICE AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-134377, filed on Aug. 7, 2020, the entire contents of which are incorporated herein by reference.

FIELD

The embodiment discussed herein is related to an information processing device and a non-transitory computer-readable storage medium.

BACKGROUND

When paid storage such as cloud storage is used, usage cost is determined based on the size of data. Therefore, the usage cost depends on a data deduplication rate by deduplication. If the deduplication rate is large, the size of data can be reduced by deduplication, and the usage cost can be reduced. For example, in a case of 1 peta byte (PB) data, if the reduction rate is different by 10%, 100 tera bytes (TB) of storage becomes unnecessary. Therefore, when using paid storage, it is important to estimate the deduplication rate.

Note that as a conventional technology, there is an information processing device that calculates a deduplication rate when a plurality of pools is integrated so that the user can estimate in advance the size of a physical area required after integration. This information processing device has a duplication number calculation unit and a deduplication rate calculation unit. The duplication number calculation unit calculates the number of duplications of unit data of two pools and the total number of reference counts of the two pools. The deduplication rate calculation unit calculates the deduplication rate using the number of duplications and the total number of reference counts.

Furthermore, as a conventional technology, there is a storage system that achieves both reduction of data reduction effect and improvement of deduplication performance. This storage system divides data into a plurality of pieces of chunk data in the deduplication process, follows a sampling cycle that means selection of one chunk data for every N pieces of chunk data on average, and selects one or more of the plurality of pieces of chunk data. Then, this storage system calculates a fingerprint such as a hash value for each of one or more pieces of feature chunk data which is the selected one or more pieces of chunk data, and determines whether or not the data including the feature chunk data is duplicated. Furthermore, the storage system changes the sampling cycle based on a result of past deduplication processes.

Japanese Laid-open Patent Publication No. 2019-16293 and International Publication Pamphlet No. WO 2016/181479 are disclosed as related art.

SUMMARY

According to an aspect of the embodiments, an information processing device includes: a memory; and a processor coupled to the memory and configured to: extract part of data from estimation target data as a plurality of pieces of sample data and manage a number of duplications of the extracted plurality of pieces of sample data, classify the plurality of pieces of sample data into a first group and a second group based on the number of duplications, the first group having a number of duplications equal to or less that a predetermined number, the second group having a number of duplications more than a predetermined number, specify a first deduplication rate for sample data classified into the first group, specify a second deduplication rate for sample data classified into the second group, and specify a deduplication rate of the estimation target data based on the first deduplication rate and the second deduplication rate.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

It is conceivable to actually perform deduplication in order to estimate the deduplication rate. However, there is a problem that it takes time to actually perform deduplication. For example, when deduplicating 1 PB data, if the data is read at 100 mega bytes (MB)/sec, it is estimated that it takes $10^{15}/10^8$ seconds=$10^7$ seconds=$10^7/(60\times60\times24)$ days=$10^5/(36\times24)$ days, for example, 100 days or more just for reading the data.

One aspect of the embodiment is to estimate the deduplication rate accurately in a short time.

Hereinafter, an embodiment of an information processing device and a duplication rate estimation program disclosed by the present application will be described in detail based on the drawings. Note that the present embodiment does not limit the technology disclosed.

Embodiment

Figure 1A:
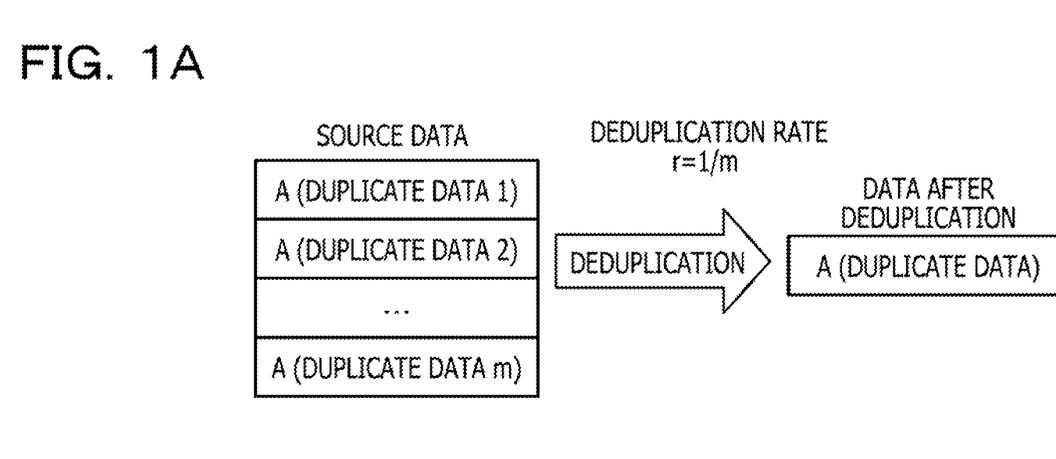
FIGS. 1A and 1B are first diagrams for explaining estimation of a deduplication rate based on an m multiplex model.
Figure 1B:
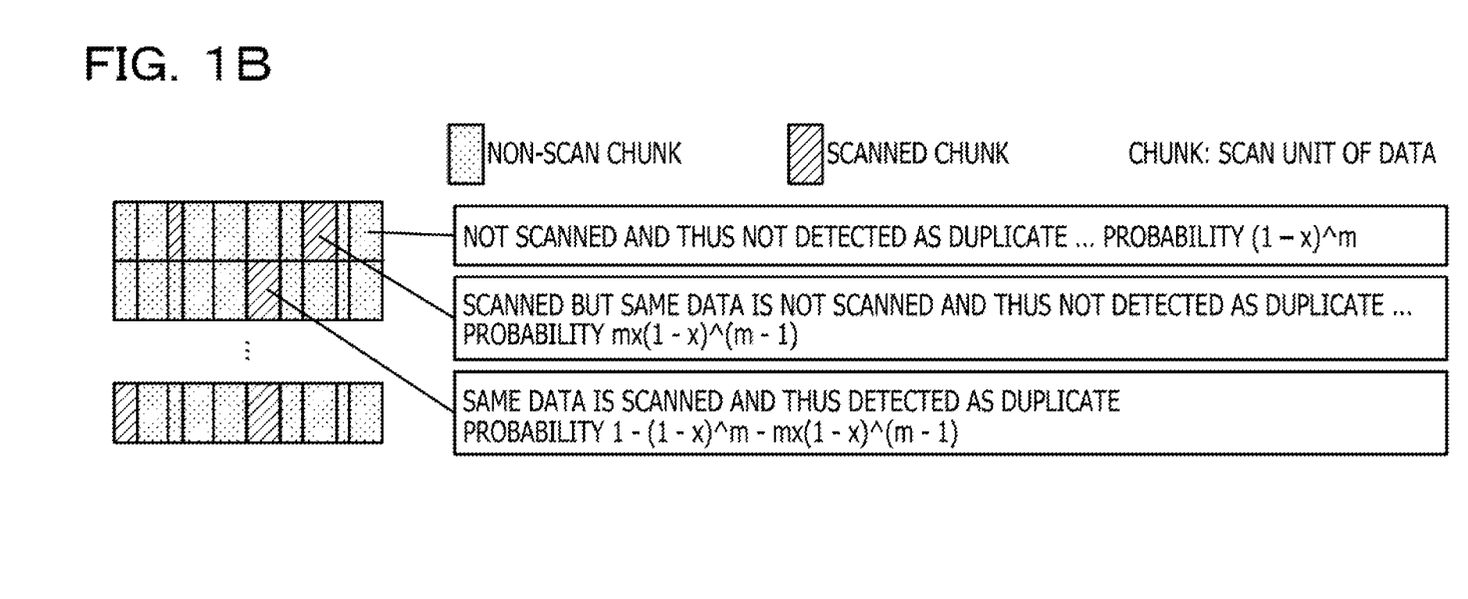
Figure 2:
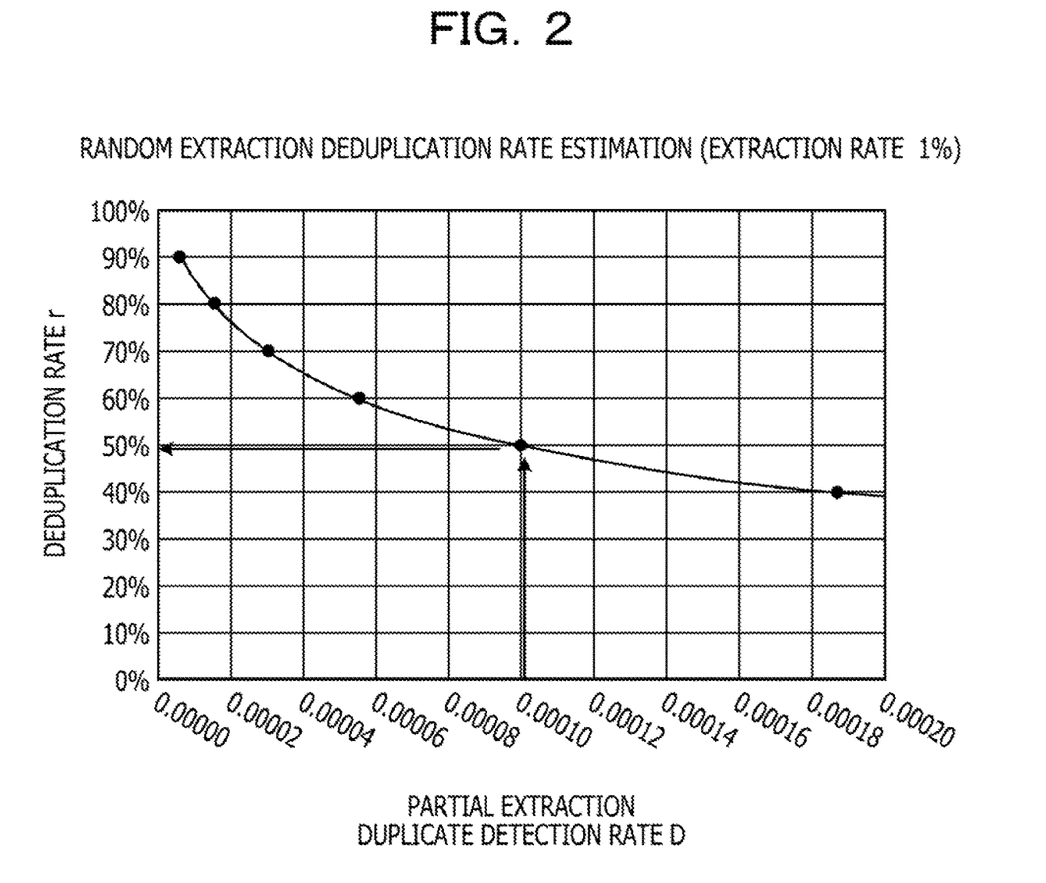
FIG. 2 is a second diagram for explaining the estimation of the deduplication rate based on the m multiplex model.

First, accuracy when a deduplication rate is estimated based on a simple model will be described with reference to FIGS. 1A to 3. FIGS. 1A, 1B, and 2 are diagrams for explaining estimation of the deduplication rate based on the m multiplex model. Here, the m multiplex model is a model in which m pieces of the same data A are included in the original data before deduplication, as illustrated in FIG. 1A. In the m multiplex model, m pieces of data becomes one piece of data due to deduplication. The deduplication rate is r=1/m.

It is assumed that x is the ratio of scanned data to original data. Here, scanning is reading data from the original data in order to estimate the deduplication rate. Scans are done in chunk units. The size of a chunk is variable, x is, for example, 0.01. Looking at each chunk, the probability of being scanned is x.

As illustrated in FIG. 1B, each chunk is one of not scanned and thus not detected as duplicate, scanned but the same data is not scanned and thus not detected as duplicate, or the same data is scanned and thus detected as duplicate.

The probability that chunks will not be scanned and will not be detected as duplicate is $(1-x)^m$ because the probability of not being scanned is $1-x$. "^" represents exponentiation. The probability that chunks will be scanned and the same data will not be detected as duplicate is $m \cdot x \cdot (1-x)^{(m-1)}$. "·" represents multiplication. The probability that chunks will be scanned and the same data will be duplicated as duplicate is $1-(1-x)^m - m \cdot x \cdot (1-x)^{(m-1)}$ by subtracting the above-described two probabilities from 1.

When it is assumed that D is the rate of duplicate detection in the actual scan, as followings Equation (1).

$$1-(1-x)^m - n \cdot x \cdot (1-x)^{(m-1)} = D \quad (1).$$

In Equation (1), when the measured value is substituted for D and a fixed value such as 0.01 is substituted for x, Equation (1) is an equation for m, and m may be calculated by solving this equation.

Since the left side of Equation (1) is a monotonic function for m, m may be calculated by performing an approximate search using m as a parameter without solving the equation of Equation (1). Furthermore, since r=1/m, r may be calculated from m. FIG. 2 is a graph illustrating the relationship between D and r when x=0.01. From FIG. 2, when D=0.0001, a deduplication rate r is 0.5.

Figure 3:
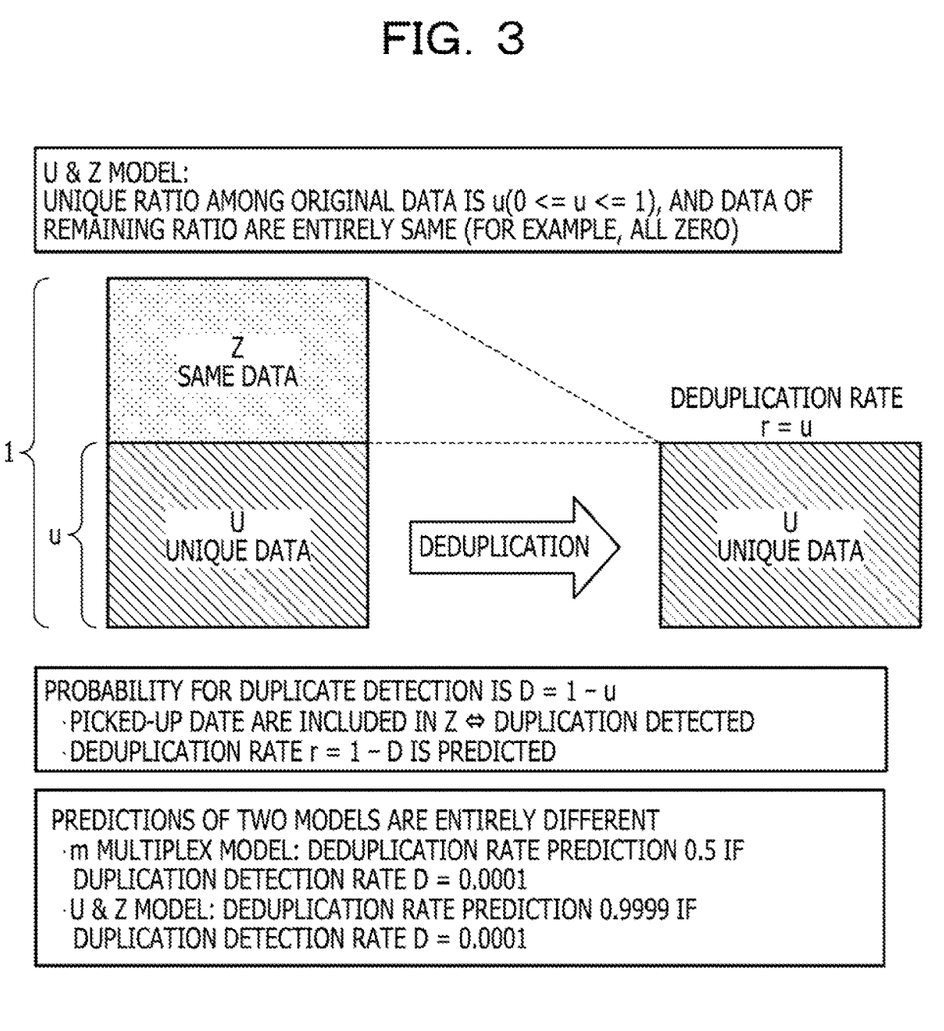
FIG. 3 is a diagram for explaining a U & Z model.

FIG. 3 is a diagram for explaining a U & Z model. As illustrated in FIG. 3, the U & Z model is a model such that a unique ratio among original data is u (0≤u≤1), and data of the remaining ratio (1−u) are exactly the same (for example, all 0). In FIG. 3, U is a set of unique data and Z is a set of the same data. When the model of the original data is the U & Z model, the same data is deduplicated and the deduplication rate r=u. Furthermore, probability that picked up data is included in Z=probability D to be detected as duplicate=1−u. Therefore, the deduplication rate r=1−D, and when D=0.0001, the deduplication rate r=0.9999.

Thus, if the model of original data is different, the predicted value of the deduplication rate will be largely different. For example, if the model of the original data is a simple model and the deduplication rate is predicted by partial scanning, accuracy of a predicted value is poor. Accordingly, it is conceivable to complicate the model of the original data to improve the accuracy of the predicted value.

Figure 4:
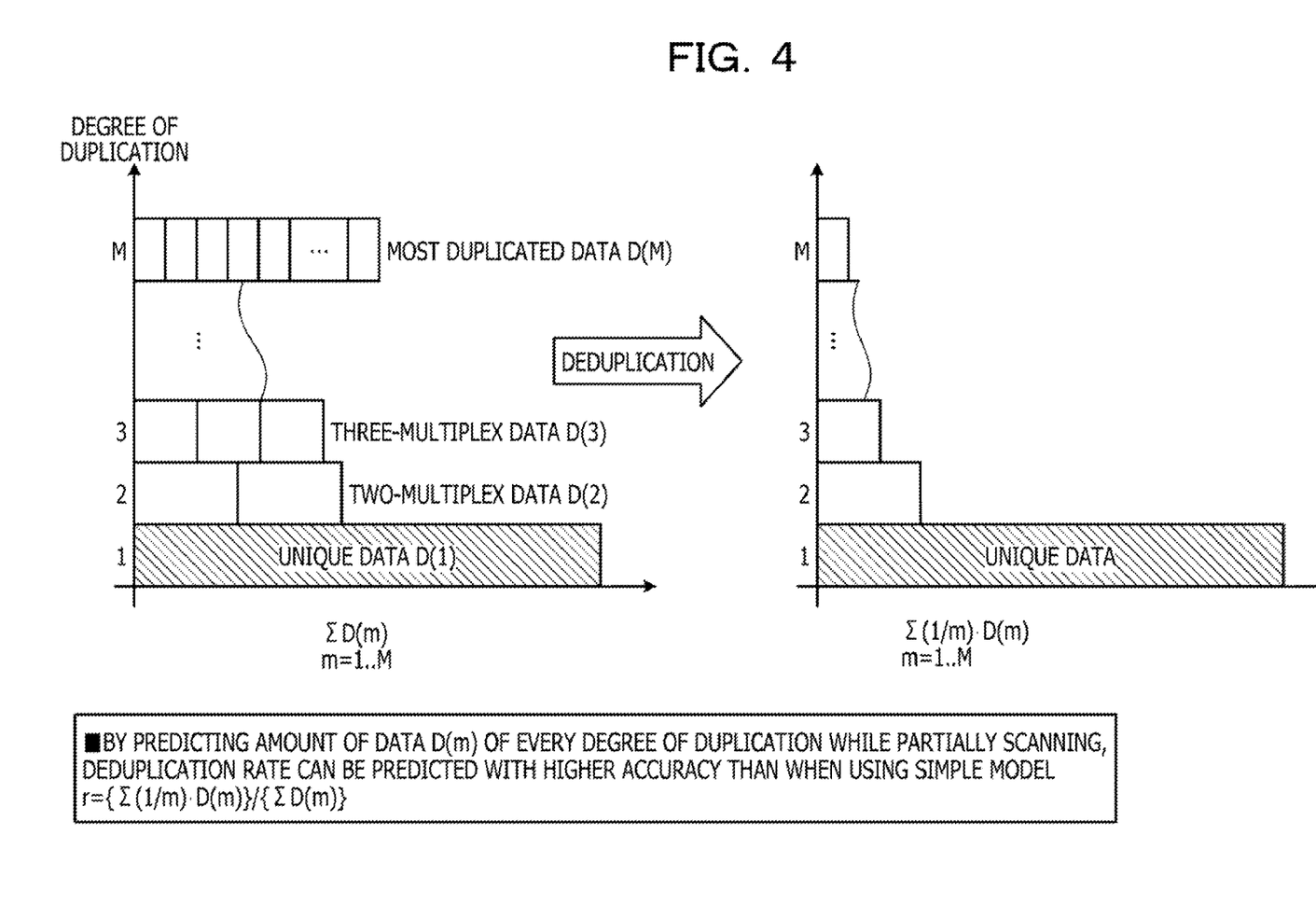
FIG. 4 is a diagram illustrating an example of a complicated model.

FIG. 4 illustrates an example of a complicated model. As illustrated in FIG. 4, assuming that the amount of unique data is D(1), the amount of two-multiplexed data is D(2), . . . , and the amount of most multiplexed data is D(M), the amount of data of the original data is $\Sigma D(m)$ (m=1 . . . ). Here, "1 . . . M" represents "from 1 to M". The amount of data after deduplication from the original data is $\Sigma(1/m)D(m)$ (m=1 . . . M). Therefore, a deduplication rate r may be predicted by predicting the amount of data D(m) (m=1 . . . M) for every degree of duplication while performing partial scanning, $r=\{\Sigma(1/m)D(m)\}/\{\Sigma D(m)\}$. Note that in this equation of r, (m=1 . . . M) is omitted.

The amount of data D(m) (m=1 . . . M) is predicted as follows. The probability that data with a degree of duplication m is detected as duplicate in n multiple times by partial scanning at a ratio of x is $C(m, n), x^n, (1-x)^{(m-n)}$. Here, $C(m, n)$ is $m!/\{(m-n)!n!\}$.

Figure 5:
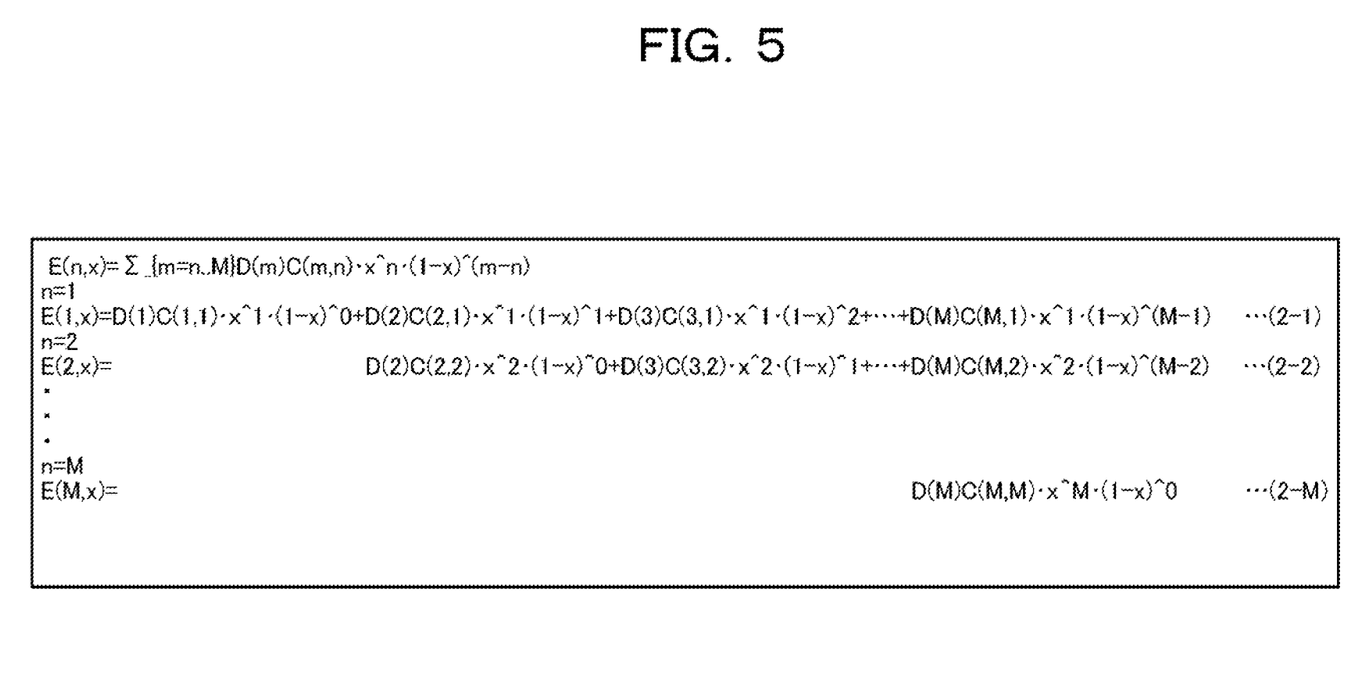
FIG. 5 is a diagram illustrating expected values $E(n, x)$ for $n=1, 2, \ldots, M$.

Therefore, the expected value E(n, x) of the amount of data detected n multiple times by partial scanning at a ratio of x is $E(n, x) = \Sigma\_\{m=n \ldots M\} D(m) C(m, n) \cdot x^n \cdot (1-x)^{(m-n)}$. Here, $\Sigma\_\{m=n \ldots M\}$ represents the sum of m changed from n to N. FIG. 5 is a diagram illustrating the expected value E(n, x) for n=1, 2, . . . , M. As illustrated in FIG. 5, Equations (2-1) to (2-M) are simultaneous linear equations for the variables D(m) (m=1 . . . M), and by solving these simultaneous equations, the deduplication rate r may be calculated.

In Equations (2-1) to (2-M), normal curve approximation is performed for C(m, n), and when exponentiation of x or (1−x) is calculated after taking the logarithm, each term may be calculated by three exp calculations and about 10 arithmetic operations regardless of m and n. Furthermore, since the coefficient matrix is a triangular matrix, this simultaneous equation may be solved relatively easily.

However, for example, in the case of deduplication in which the total data of 1 PB is divided by a chunk length of 32 kilo bytes (KB) on average, the maximum value of M is 1 PB/32 KB=32 G. Therefore, in order to solve the simultaneous equations of Equations (2-1) to (2-M), it is necessary to calculate the inverse matrix of a huge size of 32 G×32 G, which cannot be calculated by a general server.

In this manner, if the model of original data is complicated, the deduplication rate r may be calculated with high accuracy, but the calculation cost increases. Accordingly, a duplication rate estimation device according to the embodiment classifies the chunks detected by the scan into "chunks that are duplicated many times" and "chunks that are duplicated only a few times", and uses a different estimation method for each group.

It is part of data that are duplicated many times that makes it difficult to estimate the deduplication rate using the simultaneous equations of Equations (2-1) to (2-M). Those that are duplicated only a few times have a relatively small proportion that contributes to an error in the overall expected value calculation. The larger the m, the larger the coefficient, and the more m is involved in many n. Accordingly, the duplication rate estimation device according to the embodiment scans at the ratio x of all data, counts the number of duplications of each chunk, and divides the entire scanned chunk into a group having a duplication count of N or less and a group having a duplication count of N+1 or more.

Figure 6:
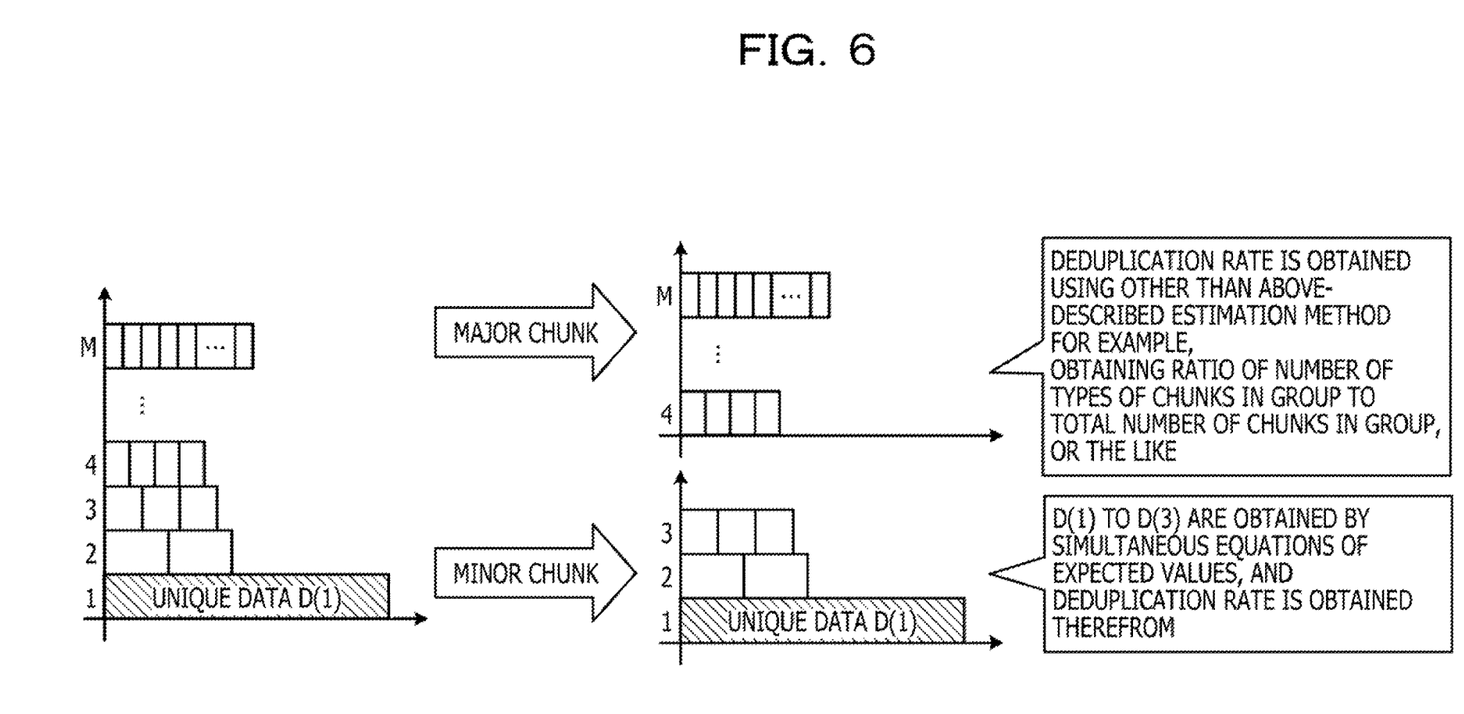
FIG. 6 is a diagram for explaining a method of estimating the deduplication rate by a duplication rate estimation device according to the embodiment.

FIG. 6 is a diagram for explaining a method of estimating the deduplication rate by the duplication rate estimation device according to the embodiment. In FIG. 6, N=3 as an example. As illustrated in FIG. 6, the duplication rate estimation device according to the embodiment divides the entire scanned chunk into a group of major chunks having a duplication count of four or more and a group of minor chunks having a duplication count of three or less.

Then, the duplication rate estimation device according to the embodiment estimates the deduplication rate by solving the simultaneous equations of Equations (2-1) to (2-M) for the group of minor chunks, and estimates the deduplication rate using other methods for the group of major chunks. In the duplication rate estimation device according to the embodiment, for a group of major chunks, for example, the ratio of the number of types of chunks in the group to the total number of chunks in the group is set as the deduplication rate. Then, the duplication rate estimation device according to the embodiment estimates the overall deduplication rate by adding up estimation results of the two groups.

In this manner, the duplication rate estimation device according to the embodiment solves the simultaneous equations of Equations (2-1) to (2-M) to estimate the deduplication rate only for the group of minor chunks, and thus M may be reduced and the calculation cost may be reduced.

Figure 7:
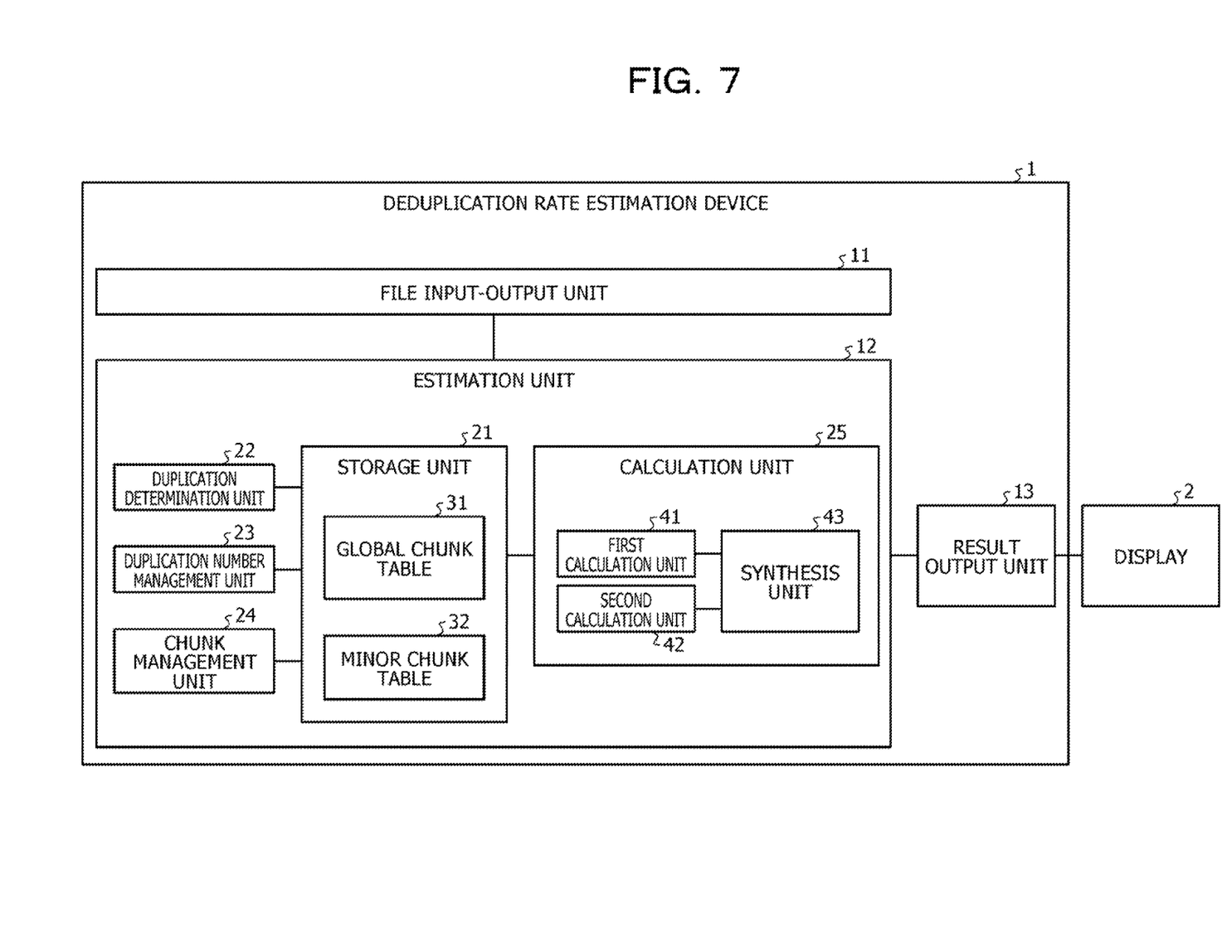
FIG. 7 is a diagram illustrating a functional configuration of the duplication rate estimation device according to the embodiment.

Next, a functional configuration of the duplication rate estimation device according to the embodiment will be described. FIG. 7 is a diagram illustrating a functional configuration of the duplication rate estimation device according to the embodiment. As illustrated in FIG. 7, the duplication rate estimation device 1 according to the embodiment includes a file input-output unit 11, an estimation unit 12, and a result output unit 13.

The file input-output unit 11 acquires data at the ratio x from estimation target data. The file input-output unit 11 acquires the data at the ratio x as a plurality of chunks. The file input-output unit 11 reads chunks from, for example, a file stored on a local disk. The file input-output unit 11 may read chunks via a network attached storage (NAS) interface such as network file system (NFS) or server message block (SMB).

The estimation unit 12 calculates the deduplication rate of the estimation target data using a plurality of chunks read by the file input-output unit 11.

The result output unit 13 displays the deduplication rate calculated by the estimation unit 12 on a display 2. The result output unit 13 may write the deduplication rate to a file.

The estimation unit 12 includes a storage unit 21, a duplication determination unit 22, a duplication number management unit 23, a chunk management unit 24, and a calculation unit 25.

The storage unit 21 stores information regarding chunks using a global chunk table 31 and a minor chunk table 32. The global chunk table 31 is a table used for managing the number of duplications of chunks. The minor chunk table 32 is a table used to manage the number of chunk types included in a group of minor chunks.

Figure 8A:
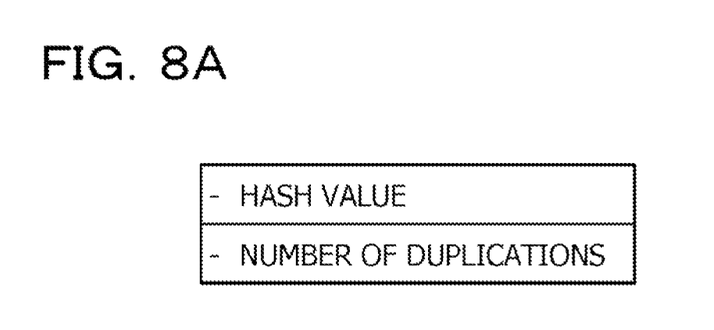
FIGS. 8A and 8B are diagrams illustrating an example of respective records included in a global chunk table and a minor chunk table.
Figure 8B:
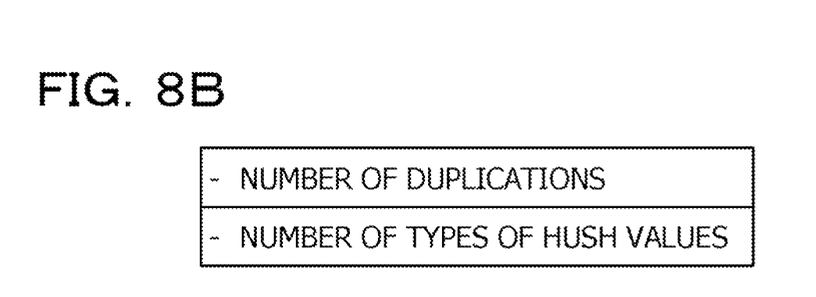

FIGS. 8A and 8B are diagrams illustrating an example of respective records included in the global chunk table 31 and the minor chunk table 32. FIG. 8A illustrates records included in the global chunk table 31, and FIG. 86 illustrates records included in the minor chunk table 32.

As illustrated in FIG. 8A, the records included in the global chunk table 31 include hash values and the number of duplications. The hash value is a value calculated from chunks using a hash function. The number of duplications is the number of duplications of chunks corresponding to the hash value. In the global chunk table 31, the hash value is the key.

As illustrated in FIG. 86, the records included in the minor chunk table 32 include the number of duplications and the number of types of hash values. The number of duplications is the number of duplications of chunks included in the minor chunk table 32. The number of types of hash values is the number of types of hash values (chunks) in which a duplicating number is the number of duplications.

Returning to FIG. 7, the duplication determination unit 22 calculates the hash value of a chunk read by the file input-output unit 11 and determines whether or not the calculated hash value is registered in the global chunk table 31, to thereby determine whether or not chunks are duplicated.

The duplication number management unit 23 manages the number of duplications for every chunk using the global chunk table 31. When the duplication determination unit 22 determines that the calculated hash value is registered in the global chunk table 31, the duplication number management unit 23 adds one to the number of duplications corresponding to the hash value. On the other hand, when the duplication determination unit 22 determines that the calculated hash value is not registered in the global chunk table 31, the hash value is registered in the global chunk table 31 and the corresponding number of duplications is set to one.

The chunk management unit 24 divides the entire chunk into a group of minor chunks and a group of major chunks based on the number of duplications, and manages information of chunks. The chunk management unit 24 reads one record at a time from the global chunk table 31 to create and manage a minor chunk table 32. Furthermore, the chunk management unit 24 calculates the total number of chunks belonging to the major group and the number of types of chunks belonging to the major group.

The calculation unit 25 calculates the deduplication rate of the estimation target data based on the information managed by the chunk management unit 24. The calculation unit 25 has a first calculation unit 41, a second calculation unit 42, and a synthesis unit 43.

The first calculation unit 41 estimates the deduplication rate r by estimating the amount of data $D(m)$ ($m=1 \ldots N$) for every degree of duplication for a group of minor chunks. The first calculation unit 41 uses the expected value $E(n, x)$ of the amount of data detected n multiple times in partial scanning at the ratio x for the group of minor chunks to estimate the amount of data $D(m)$ ($m=1 \ldots N$).

For example, the first calculation unit 41 calculates the deduplication rate by solving the simultaneous equations of Equations (2-1) to (2-M) for the group of minor chunks. The first calculation unit 41 reads one record at a time from the minor chunk table 32 and creates simultaneous equations.

The second calculation unit 42 calculates the ratio of the number of types of chunks in the group to the total number of chunks in the group as the deduplication rate for the group of major chunks.

The synthesis unit 43 calculates a weighted average based on the deduplication rate calculated by the first calculation unit 41 and the number of chunks of the deduplication rate calculated by the second calculation unit 42, thereby calculating the deduplication rate of the estimation target data.

Figure 9A:
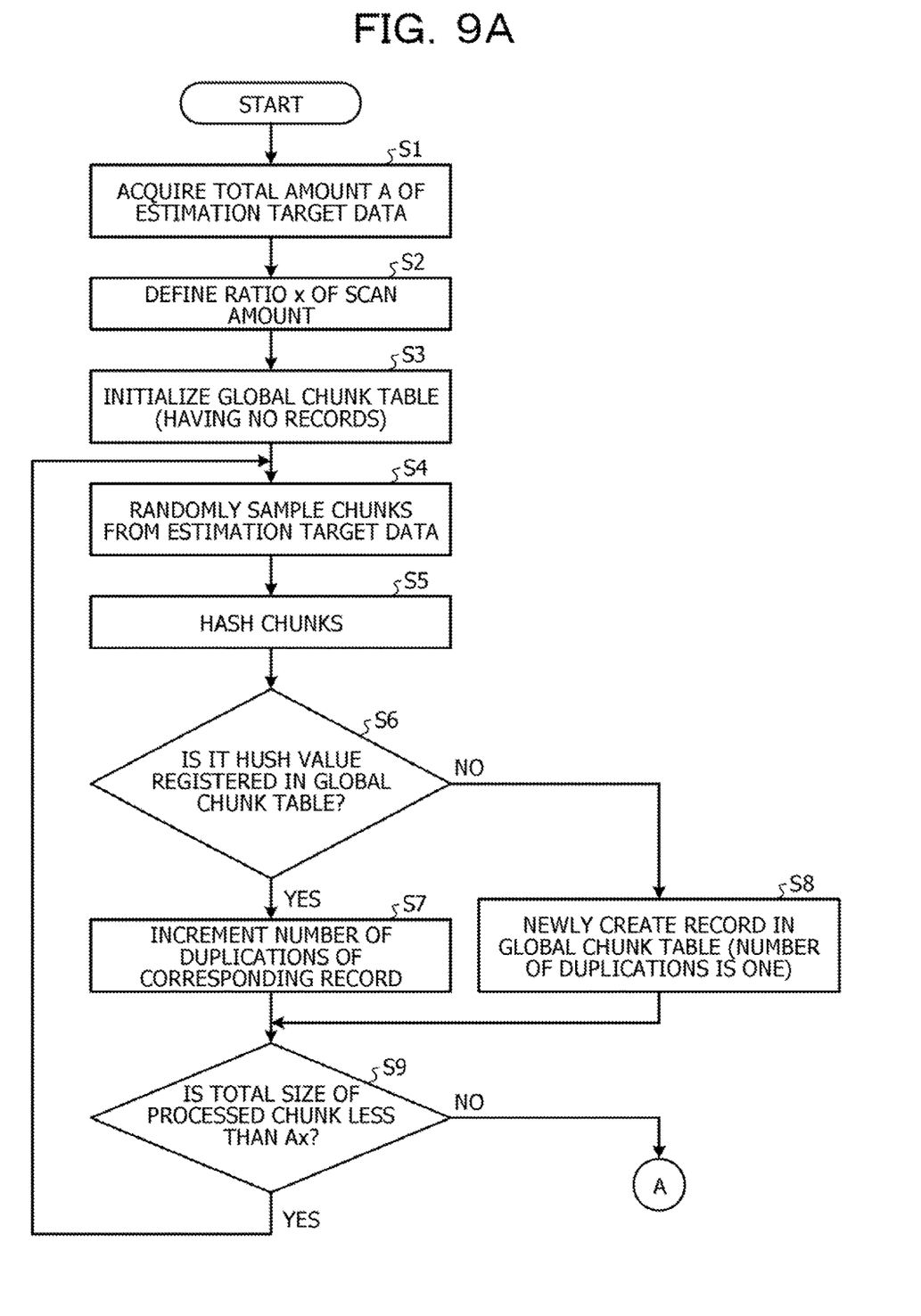
FIG. 9A is a first flowchart illustrating a flow of processing by the duplication rate estimation device.
Figure 9B:
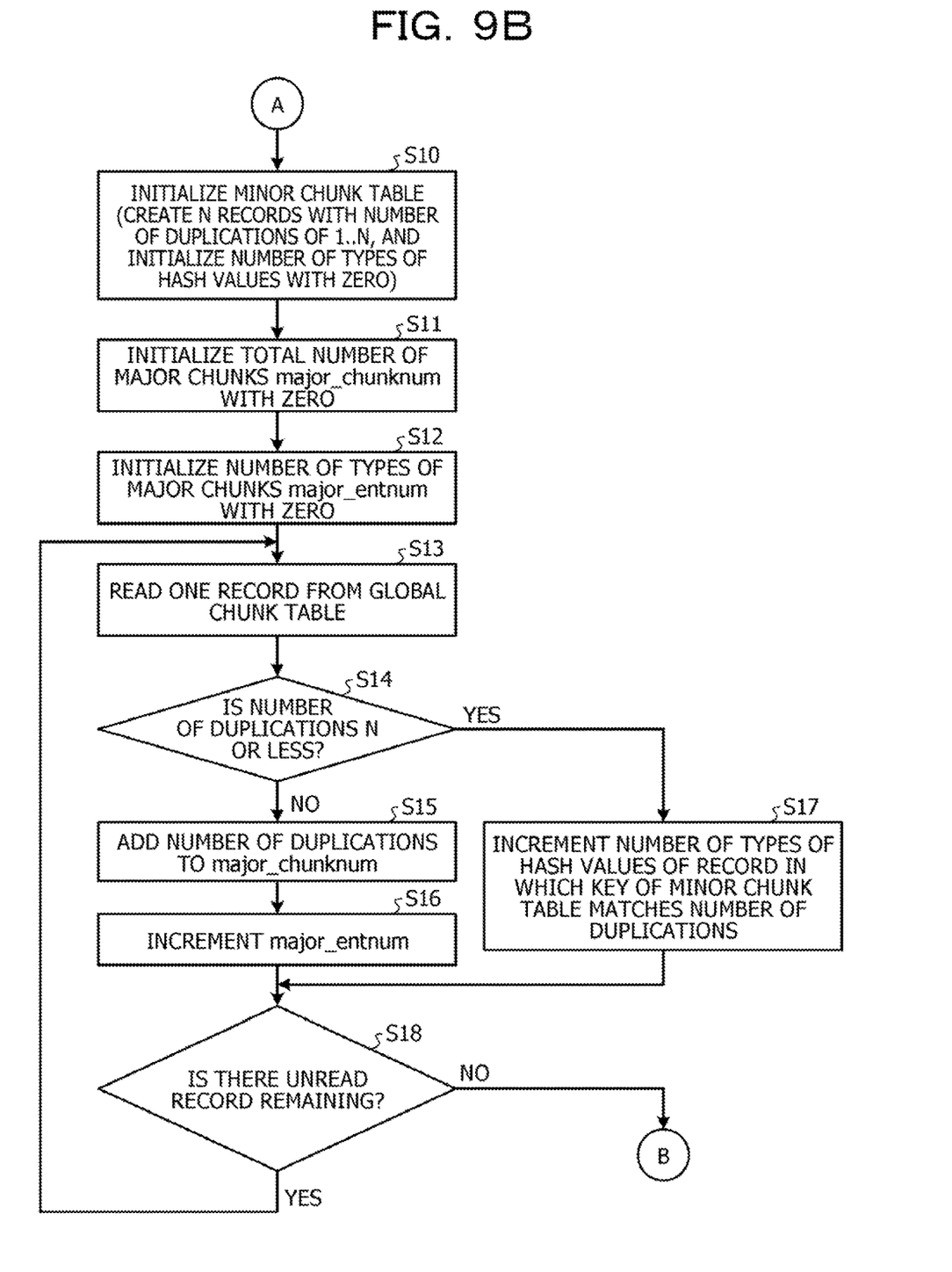
FIG. 9B is a second flowchart illustrating a flow of processing by the duplication rate estimation device.
Figure 9C:
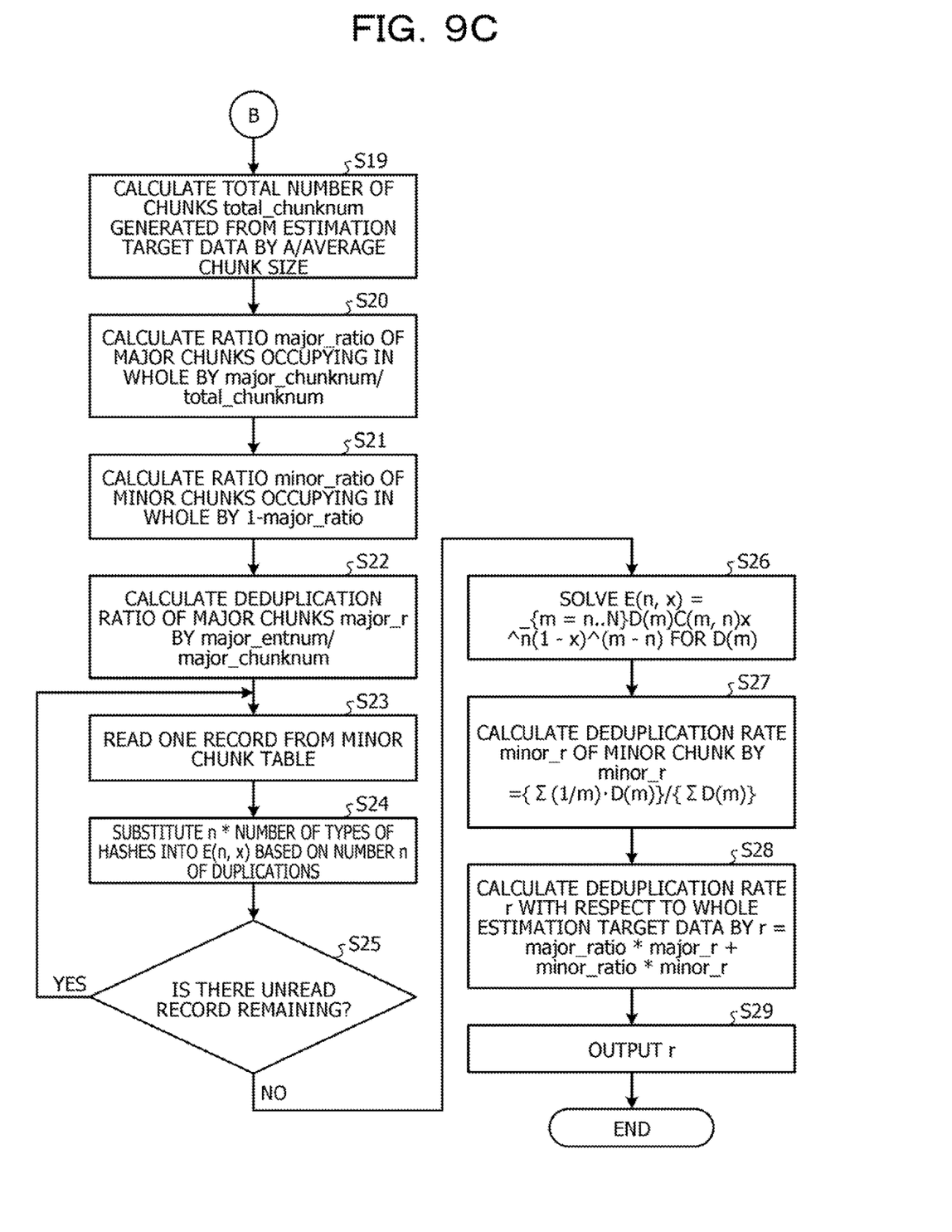
FIG. 9C is a third flowchart illustrating a flow of processing by the duplication rate estimation device.

Next, a flow of processing by the duplication rate estimation device 1 will be described with reference to FIGS. 9A to 9C. FIGS. 9A to 9C are flowcharts illustrating a flow of processing by the duplication rate estimation device 1. As illustrated in FIG. 9A, the duplication rate estimation device 1 acquires the total amount A of estimation target data (step S1) and defines the ratio of scan amount x (step S2). Note that the duplication rate estimation device 1 may accept a value input by the user using a keyboard or a mouse as x.

Then, the duplication rate estimation device 1 initializes the global chunk table 31 (step S3). For example, the duplication rate estimation device 1 puts the global chunk table 31 in a state having no records. Then, the duplication rate estimation device 1 randomly samples chunks (sample data) from the estimation target data (step S4).

Then, the duplication rate estimation device 1 hashes the chunks (step S5), and determines whether or not the hashed value is a hash value registered in the global chunk table 31 (step S6). Then, when the hashed value is a hash value registered in the global chunk table 31, the duplication rate estimation device 1 increments (increases by one) the number of duplications of records corresponding to the registered hash value (step S7). On the other hand, when the hashed value is not a hash value registered in the global chunk table 31, the duplication rate estimation device 1 newly creates a record including the hashed value in the global chunk table 31 (step S8). At that time, the duplication rate estimation device 1 sets the number of duplications of the created records to one.

Then, the duplication rate estimation device 1 determines whether or not the total size of the processed chunks is less than $A \cdot x$ (step S9) and, when it is less than $A \cdot x$, returns to step S4. On the other hand, when the total size of the processed chunks is not less than $A \cdot x$, the duplication rate estimation device 1 initializes the minor chunk table 32 as illustrated in FIG. 9B (step S10). Specifically, the duplication rate estimation device 1 creates N records with the number of duplications of 1 . . . N, and initializes the number of types of hash values of each record with zero.

Then, the duplication rate estimation device 1 initializes the total number of major chunks major_chunknum with zero (step S11), and initializes the number of types of major chunks major_entnum with zero (step S12). Then, the duplication rate estimation device 1 reads one record from the global chunk table 31 (step S13), and determines whether or not the number of duplications is N or less (step S14).

Then, when the number of duplications is not N or less, the duplication rate estimation device 1 adds the number of duplications to the major_chunknum (step S15) and increments the major_entnum (step S16). On the other hand, when the number of duplications are N or less, the duplication rate estimation device 1 increments the number of types of hash values of the record in which the key of the minor chunk table 32 matches the number of duplications (step S17).

Then, the duplication rate estimation device 1 determines whether or not there is any unread record remaining in the global chunk table 31 (step S18) and, when there is an unread record remaining, returns to step S13. On the other hand, when there is no unread record remaining, the duplication rate estimation device 1 calculates the total number of chunks total_chunknum generated from the estimation target data by A/average chunk size as illustrated in FIG. 9C (step S19).

Then, the duplication rate estimation device 1 calculates a ratio major_ratio of the major chunks occupying in the whole by major_chunknum/total_chunknum (step S20), and calculates a ratio minor_ratio of the minor chunks occupying in the whole by 1-major_ratio (step S21). Then, the duplication rate estimation device 1 calculates the deduplication rate major_r of major chunks by major_entnum/major_chunknum (step S22).

Then, the duplication rate estimation device 1 reads one record from the minor chunk table 32 (step S23), and substitutes n*number of types of hashes into E(n, x) based on the number n of duplications of the read record (step S24). Here, "*" indicates multiplication. Then, the duplication rate estimation device 1 determines whether or not there is any unread record remaining in the minor chunk table 32 (step S25) and, when there is an unread record remaining, returns to step S23.

On the other hand, when there is no unread record remaining in the minor chunk table 32, the duplication rate estimation device 1 solves $E(n, x) = \Sigma\_\{m=n \ldots M\} D(m) C(m, n) \cdot x^n \cdot (1-x)^{(m-n)}$ for D(m) (step S26). Then, the duplication rate estimation device 1 calculates the deduplication rate minor_r of the minor chunks by minor_r=$\{\Sigma(1/m) \cdot D(m)\}/\{\Sigma D(m)\}$ (step S27).

Then, the duplication rate estimation device 1 calculates the deduplication rate r with respect to the whole estimation target data by r=major_ratio*major_r+minor_ratio*minor_r (step S28). Then, the duplication rate estimation device 1 outputs r (step S29).

In this manner, the duplication rate estimation device 1 calculates the deduplication rate by dividing it into a group of major chunks and a group of minor chunks, and thus the calculation cost may be suppressed.

As described above, in the embodiment, the file input-output unit 11 acquires data at the ratio x from the estimation target data as a plurality of chunks. Then, the duplication determination unit 22 calculates a hash value of the chunks read by the file input-output unit 11 and determines whether or not the calculated hash value is duplicated. Then, the duplication number management unit 23 manages the number of duplications for every chunk based on a determination result of the duplication determination unit 22. Then, the chunk management unit 24 divides the entire chunk into a group of minor chunks and a group of major chunks based on the number of duplications. Then, the first calculation unit 41 calculates the deduplication rate for the group of minor chunks, and the second calculation unit 42 calculates the deduplication rate for the group of major chunks. Then, the synthesis unit 43 calculates the deduplication rate of the estimation target data based on the deduplication rate calculated by the first calculation unit 41 and the deduplication rate calculated by the second calculation unit 42. Therefore, the duplication rate estimation device 1 may accurately estimate the deduplication rate in a short time.

Furthermore, in the embodiment, the first calculation unit 41 estimates D(1) to D(N) for a group of minor chunks, and calculates the deduplication rate based on the estimated D(1) to D(N), and thus the deduplication rate of the group of minor chunks may be estimated with high accuracy.

Furthermore, in the embodiment, the first calculation unit 41 estimates D(1) to D(N) using the expected value E(n, x) of the amount of data detected n multiple times by partial scanning of the ratio x, and thus D(1) to D(N) may be estimated with high accuracy.

For example, in the embodiment, the first calculation unit 41 solves the simultaneous equations of Equations (2-1) to (2-M) for the group of minor chunks to calculate the deduplication rate, and thus the deduplication rate of the group of minor chunks may be estimated with high accuracy.

Furthermore, in the embodiment, the second calculation unit 42 calculates the deduplication rate for the group of major chunks based on the number of types of chunks in the group and the total number of chunks in the group, and thus the deduplication rate of the group of major chunks may be estimated.

Note that although the duplication rate estimation device 1 has been described in the embodiment, a duplication rate estimation program having a similar function may be obtained by implementing a configuration of the duplication rate estimation device 1 by software. Accordingly, a computer that executes a duplication rate estimation program will be described.

Figure 10:
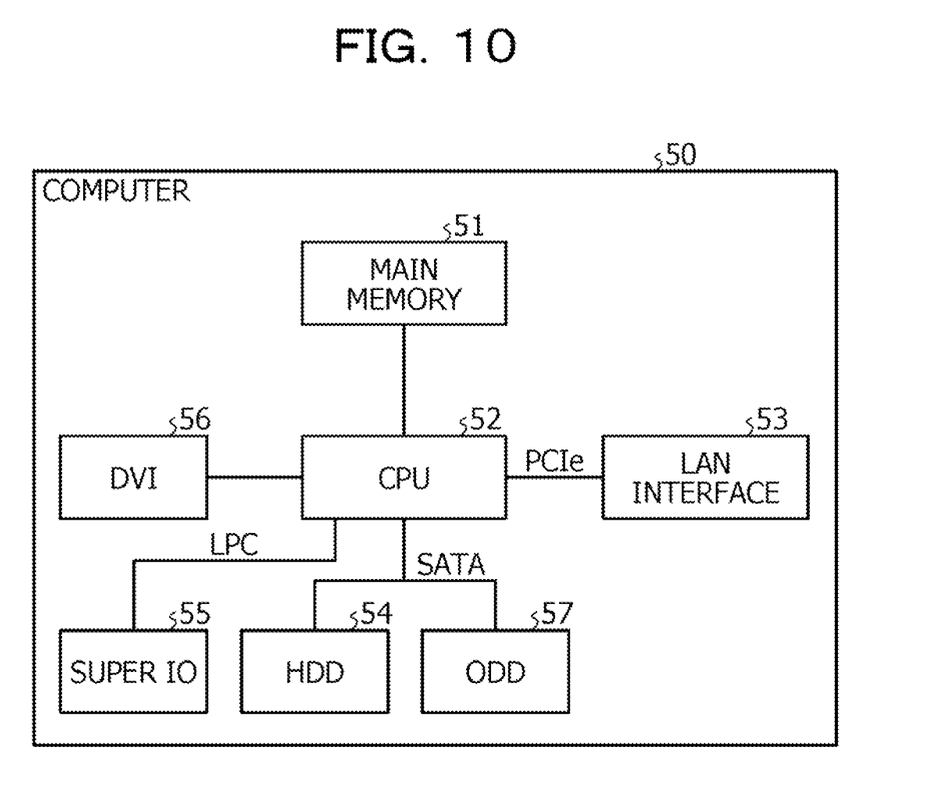
FIG. 10 is a diagram illustrating a hardware configuration of a computer that executes a duplication rate estimation program according to the embodiment.

FIG. 10 is a diagram illustrating a hardware configuration of a computer that executes a duplication rate estimation program according to the embodiment. As illustrated in FIG. 10, the computer 50 includes a main memory 51, a central processing unit (CPU) 52 that is an example of a processor, a local area network (LAN) interface 53, and a hard disk drive (HDD) 54. Furthermore, a computer 50 includes a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads and executes the program from the main memory 51. The CPU 52 includes a chipset having a memory controller.

The LAN interface 53 is an interface for connecting the computer 50 to another computer via a LAN. The HDD 54 is a disk device that stores programs and data, and the super IO 55 is an interface for connecting an input device such as a mouse and a keyboard. The DVI 56 is an interface for connecting a liquid crystal display device, and the ODD 57 is a device for reading and writing data to and from a digital versatile disc (DVD) or compact disc recordable (CD-R).

The LAN interface 53 is connected to the CPU 52 by PCI express (PCIe), and the HDD 54 and the ODD 57 are connected to the CPU 52 by serial advanced technology attachment (SATA). The super IO 55 is connected to the CPU 52 by low pin count (LPC).

Then, the duplication rate estimation program executed by the computer 50 is stored in a CD-R that is an example of a recording medium that can be read by the computer 50, is read from the CD-R by the ODD 57, and is installed to the computer 50. Alternatively, the duplication rate estimation program is stored in a database or the like of another computer system connected via the LAN interface 53, is read from these databases, and is installed to the computer 50. Then, the installed duplication rate estimation program is stored in the HDD 54, is read to the main memory 51, and is executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   an interface circuit configured to be coupled to a storage device;
   a memory; and
   a processor coupled to the memory, the processor being configured to execute a process to:
   extract, as a plurality of chunks, part of data from estimation target data stored in the storage device coupled to the information processing device via the interface circuit, by partial scanning the estimation target data at a predetermined ratio;
   count, for each chunk of the plurality of chunks, a number of duplications of the chunk by comparing respective hash values calculated from the chunk and other chunks of the plurality of chunks using a predetermined hash function, to store information indicating the counted number of duplications of the chunk in the memory;
   classify each chunk of the plurality of chunks into any one of a first group or a second group based on the number of duplications for the chunk, the first group having a number of duplications equal to or less that a predetermined number, the second group having a number of duplications more than the predetermined number;
   apply, for each chunk of the plurality of chunks, any one of a first estimation scheme or a second estimation scheme based on whether the chunk is classified into the first group or the second group, the first estimation scheme including measuring a deduplication rate with a first accuracy, the second estimation scheme including measuring a deduplication rate with a second accuracy that is less than the first accuracy of the first estimation scheme, the second estimation scheme requiring a processor load that is less than a processor load required in applying the first estimation scheme, the applying of the any one of the first estimation scheme or the second estimation scheme including:
   determining, for first chunks among the plurality of chunks, a first deduplication rate by applying the first estimation scheme to the first chunks, the first chunks being chunks classified into the first group among the plurality of chunks, and
   determining, for second chunks among the plurality of chunks, a second deduplication rate by applying the second estimation scheme to the second chunks, the second estimation scheme including measuring the second deduplication rate with an accuracy less than the first estimation scheme, the second chunks being chunks classified into the second group among the plurality of chunks; and
   output, as a deduplication rate of whole of the estimation target data, a rate obtained based on the first deduplication rate and the second deduplication rate.

2. The information processing device according to claim 1, wherein the processor is further configured to
   estimate an amount of data for each degree of duplication from one to the predetermined number using a plurality of pieces of sample data classified into the first group,
   wherein the determining of the first deduplication rate includes calculating the first deduplication rate based on the estimated amount of data for each degree of duplication.

3. The information processing device according to claim 2, wherein the processor is further configured to estimate the amount of data for each degree of duplication from one to the predetermined number based on an expected value of the amount of data for every degree of duplication of the plurality of pieces of sample data.

4. The information processing device according to claim 3, wherein the processor is further configured to
   create simultaneous equations with the amount of data for each degree of duplication as a variable for the expected value, and
   solve the created simultaneous equations to estimate the amount of data for each degree of duplication from one to the predetermined number.

5. The information processing device according to claim 1, wherein the determining of the second deduplication rate includes determining the second deduplication rate based on a total number and types of sample data classified into the second group.

6. A non-transitory computer-readable storage medium storing a program that causes a processor included in an information processing device to execute a process, the process comprising:

extracting, as a plurality of chunks, part of data from estimation target data stored in a storage device coupled to the information processing device via an interface circuit, by partial scanning the estimation target data at a predetermined ratio;

counting, for each chunk of the plurality of chunks, a number of duplications of the chunk by comparing respective hash values calculated from the chunk and other chunks of the plurality of chunks using a predetermined hash function, to store information indicating the counted number of duplications of the chunk in a memory of the information processing device;

classifying each chunk of the plurality of chunks into any one of a first group or a second group based on the number of duplications for the chunk, the first group having a number of duplications equal to or less that a predetermined number, the second group having a number of duplications more than the predetermined number;

applying, for each chunk of the plurality of chunks, any one of a first estimation scheme or a second estimation scheme based on whether the chunk is classified into the first group or the second group, the first estimation scheme including measuring a deduplication rate with a first accuracy, the second estimation scheme including measuring a deduplication rate with a second accuracy that is less than the first accuracy of the first estimation scheme, the second estimation scheme requiring a processor load that is less than a processor load required in applying the first estimation scheme, the applying of the any one of the first estimation scheme or the second estimation scheme including:

determining, for first chunks among the plurality of chunks, a first deduplication rate by applying the first estimation scheme to the first chunks, the first chunks being chunks classified into the first group among the plurality of chunks, and determining, for second chunks among the plurality of chunks, a second deduplication rate by applying the second estimation scheme to the second chunks, the second estimation scheme including measuring the second deduplication rate with an accuracy less than the first estimation scheme, the second chunks being chunks classified into the second group among the plurality of chunks; and outputting, as a deduplication rate of whole of the estimation target data, a rate obtained based on the first deduplication rate and the second deduplication rate.

7. The non-transitory computer-readable storage medium according to claim 6, wherein the process further includes estimating an amount of data for each degree of duplication from one to the predetermined number using a plurality of pieces of sample data classified into the first group, wherein the determining of the first deduplication rate includes calculating the first deduplication rate based on the estimated amount of data for each degree of duplication.

8. The non-transitory computer-readable storage medium according to claim 7, wherein the estimating includes estimating the amount of data for each degree of duplication from one to the predetermined number based on an expected value of the amount of data for every degree of duplication of the plurality of pieces of sample data.

9. The non-transitory computer-readable storage medium according to claim 8, wherein the process further includes creating simultaneous equations with the amount of data for each degree of duplication as a variable for the expected value, wherein the estimating includes estimating the amount of data for each degree of duplication from one to the predetermined number by solving the created simultaneous equations.

* * * * *